United States Patent
Ohhama et al.

(10) Patent No.: US 8,523,258 B2
(45) Date of Patent: Sep. 3, 2013

(54) MOUNTING OF SUBFRAME

(75) Inventors: Shosuke Ohhama, Wako (JP); Tetsuya Miyahara, Wako (JP); Daisuke Fukunaga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 270 days.

(21) Appl. No.: 12/948,069

(22) Filed: Nov. 17, 2010

(65) Prior Publication Data

US 2011/0115258 A1    May 19, 2011

(30) Foreign Application Priority Data

Nov. 19, 2009  (JP) ................. 2009-264304
Nov. 19, 2009  (JP) ................. 2009-264322

(51) Int. Cl.
*B62D 24/02* (2006.01)
*B62D 33/10* (2006.01)

(52) U.S. Cl.
USPC .......................... 296/35.1; 180/299

(58) Field of Classification Search
USPC ........ 296/35.1, 1.03, 190.01, 190.04, 190.07; 180/299; 248/638; 267/139, 140, 140.2, 267/141, 141.4, 141.5; 280/124.109
See application file for complete search history.

(56) References Cited

U.S. PATENT DOCUMENTS

| | | | | |
|---|---|---|---|---|
| 1,867,806 A | * | 7/1932 | Brownell | 296/35.1 |
| 2,132,840 A | * | 10/1938 | Workman et al. | 267/141.4 |
| 3,078,103 A | * | 2/1963 | Jelsch | 280/124.109 |
| 4,407,491 A | * | 10/1983 | Kunihiro et al. | 267/140.13 |
| 4,856,750 A | * | 8/1989 | Le Fol | 248/562 |
| 5,551,661 A | * | 9/1996 | Bunker | 248/634 |
| 5,941,511 A | * | 8/1999 | Dawda et al. | 267/140.12 |
| 5,984,036 A | * | 11/1999 | Higuchi et al. | 180/89.12 |
| 6,158,726 A | * | 12/2000 | Coleman et al. | 267/292 |
| 6,416,102 B1 | * | 7/2002 | Howard | 296/35.1 |
| 6,997,276 B2 | | 2/2006 | Yoshida et al. | |
| 7,416,244 B2 | * | 8/2008 | Polk et al. | 296/190.07 |
| 7,677,627 B2 | * | 3/2010 | Aoyama et al. | 296/35.1 |
| 7,997,566 B2 | * | 8/2011 | Kuzukawa | 267/140.13 |
| 8,104,826 B2 | * | 1/2012 | Fukunaga et al. | 296/190.07 |
| 2009/0289472 A1 | * | 11/2009 | Catanzarite et al. | 296/190.07 |

FOREIGN PATENT DOCUMENTS

| | | | |
|---|---|---|---|
| EP | 1595772 A2 | * | 11/2005 |
| JP | 52064570 A | * | 5/1977 |
| JP | 59195472 A | * | 11/1984 |
| JP | 61232968 A | * | 10/1986 |
| JP | 03007507 A | * | 1/1991 |
| JP | 03033530 A | * | 2/1991 |
| JP | 03279082 A | * | 12/1991 |
| JP | 04011582 A | * | 1/1992 |
| JP | 04-092770 A | | 3/1992 |
| JP | 04224329 A | * | 8/1992 |

(Continued)

*Primary Examiner* — Glenn Dayoan
*Assistant Examiner* — Paul Chenevert
(74) *Attorney, Agent, or Firm* — Carrier Blackman & Associates, P.C.; Joseph P. Carrier; William D. Blackman

(57) ABSTRACT

In a structure for mounting a subframe, located under a vehicle body, to the vehicle body via an elastic assembly, the elastic assembly includes: a first mounting member located under the vehicle body and over the subframe; a second mounting member located immediately above the first mounting member; and an elastic member disposed between the first and second mounting members. The first mounting member is mounted to the vehicle body, while the second mounting member is mounted to the subframe.

7 Claims, 10 Drawing Sheets

(56) References Cited

FOREIGN PATENT DOCUMENTS

| JP | 08189544 A | * | 7/1996 |
|---|---|---|---|
| JP | 08338468 A | * | 12/1996 |
| JP | 11-310150 A | | 11/1999 |
| JP | 2000-072029 A | | 3/2000 |
| JP | 2003-194147 A | | 7/2003 |
| JP | 2003335261 A | * | 11/2003 |
| JP | 2004-098799 A | | 4/2004 |
| JP | 2004291795 A | * | 10/2004 |
| JP | 2005271731 A | * | 10/2005 |
| JP | 2006-290238 A | | 10/2006 |

* cited by examiner

MOUNTING OF SUBFRAME

FIELD OF THE INVENTION

The present invention relates to mounting, to a vehicle body, a subframe located under the vehicle body.

BACKGROUND OF THE INVENTION

Generally, a sub frame located under a vehicle body is mounted to the vehicle body via damping or vibration-absorbing elastic assemblies. Subframe mounting structures which are constructed to fix a front end portion, middle portion and rear end portion of a subframe, located under a vehicle body, to the vehicle body via respective elastic assemblies are known as disclosed, for example, in Japanese Patent Application Laid-Open Publication No. 2004-98799 (JP 2004-98799 A).

Particularly, the elastic assembly of the middle portion (hereinafter referred to as "middle elastic assembly") of the subframe disclosed in JP 2004-98799 A comprises a pair of upper and lower metal plates extending horizontally, and a damping or vibration-absorbing elastic member formed, for example, of rubber and integrally molded with and between the upper and lower horizontal metal plates. The upper metal plate is fixedly mounted, by means of a bolt, to the lower surface of the vehicle body via a cylindrical collar extending upward from the upper surface of the upper metal plate. The lower metal plate is fixedly mounted, by means of a plurality of bolts, to a side surface of the subframe. However, with the technique disclosed in JP 2004-98799 A, there are certain limitations in enhancing durability of the elastic member against a load acting from the subframe.

In many cases, the middle elastic assembly is mounted to the vehicle body before it is mounted to the subframe, for convenience of assembly work. The middle elastic assembly is fixed to the vehicle body by the single bolt, passed through the cylindrical collar, being screwed into the vehicle body. However, during the screwing of the bolt, the collar may undesirably rotate in the same direction as the bolt; namely, there may occur undesired corotation of the middle elastic assembly. Due to such corotation, the middle elastic assembly cannot be mounted to the subframe in a predetermined orientation relative to the subframe.

In general, some rotation-preventing member is fixed to the upper end of the collar by welding or otherwise. By engaging the rotation-preventing member with the vehicle body, it is possible to prevent the collar from corotating with the bolt.

In manufacturing the middle elastic assembly, the elastic member is formed by setting the upper and lower metal plates and collar into a mold, pouring a rubber composition into cavities formed inside the mold and then causing the rubber composition to cure. However, if a rotation-preventing member is fixed to the upper end of the collar as noted above, the mold has to be complicated in construction. Namely, the mold has to be constructed so as not to interfere with the rotation-preventing member when being opened or closed. As one conceivable way to avoid the mold from interfering with the rotation-preventing member, sliding dies openable and closable in a horizontal or left-right direction may be provided in addition to the mold openable and closable in a vertical or up-down direction, in which case, however, the mold would become complicated in construction. Further, merely providing the sliding dies may undesirably produce, on the outer surface of the elastic member, burrs resulting from mating surfaces of the sliding dies (i.e., parting line between the sliding dies), and such burrs are not preferable in enhancing durability of the elastic member.

SUMMARY OF THE INVENTION

In view of the foregoing prior art problems, it is an object of the present invention to provide an improved subframe mounting structure which can enhance the durability of the elastic member.

It is another object of the present invention to provide an improved elastic assembly manufacturing method which can not only simplify the construction of the mold but also prevent production of burrs during molding of the elastic assembly.

According to one aspect of the present invention, the present invention provides an improved structure for mounting a subframe to a vehicle body, which comprises: the vehicle body; an elastic assembly; and the subframe located under the vehicle body and mounted to the vehicle body via the elastic assembly, the elastic assembly including: a first mounting member located under the vehicle body and over the subframe and mounted to the vehicle body; a second mounting member mounted to the subframe and extending upward from the subframe to be located immediately above the first mounting member; and an elastic member disposed between the first mounting member and the second mounting member.

In the present invention, the second mounting member is disposed immediately above the first mounting member, mounted to the vehicle body, via the elastic member, and the second mounting member is mounted to the subframe. Thus, a downward load of the subframe is transmitted from the second mounting member onto the elastic member as a compressive load, and then from the elastic member onto the first mounting member. Namely, the elastic member is compressed between the first and second mounting members. Thus, the present invention can not only enhance the durability of the elastic member but also enhance the durability of a joint, to the first and second mounting members, of the elastic member.

Preferably, the elastic assembly further includes a cylindrical collar and a bolt extending axially through the collar. Further, the collar extends upward from the upper surface of the first mounting member to extend through the second mounting member, the collar having an upper end surface superposed on the underside of the vehicle body to thereby vertically position the first mounting member relative to the vehicle body, the bolt extends vertically through the first mounting member and through the collar to be screwed to the vehicle body, thereby mounting the first mounting member to the vehicle body, and the elastic member is integrally molded to the first and second mounting members and the collar in such a manner as to wrap around the first and second mounting members and the collar. Thus, vertical vibration transmitted from the subframe to the first mounting member can be sufficiently received and absorbed by the elastic member.

Preferably, the elastic member is disposed on the upper surface of the second mounting member to wrap around the collar extending axially through the second mounting member and the upper surface and outer peripheral edge region of the second mounting member. Thus, the present invention can minimize concentration of stress produced in the elastic member around the collar extending axially through the elastic member and around the outer peripheral region of the second mounting member, thereby enhancing the durability of the portion where the elastic member is joined to the second mounting member.

According to another aspect of the present invention, there is provided an improved method for manufacturing an elastic assembly for mounting a vehicular subframe, located under a vehicle body, to the vehicle body, the elastic assembly including: a first mounting member located under the vehicle body and over the subframe and mounted to the vehicle body; a second mounting member mounted located immediately above the first mounting member and mounted to the subframe; a collar extending upward from the upper surface of the first mounting member to extend through the second mounting member, the collar having an upper end surface superposed on the underside of the vehicle body; a bolt extending vertically through the first mounting member and through the collar to be screwed to the vehicle body, thereby mounting the first mounting member to the vehicle body; a rotation-preventing member attached to the upper end of the collar for, when the bolt is to be screwed to the vehicle body, preventing rotation of the collar by engaging with the vehicle body; and an elastic member integrally molded to the first and second mounting members and the collar, the method comprising: a step of molding the elastic member integrally to the first and second mounting members and the collar using a mold dividable only in a vertical direction of the elastic assembly; and a step of press-fitting the rotation-preventing member into an upper portion of the collar after the step of molding.

Thus, in the present invention, the mold to be used for molding the elastic member has to be dividable only in a vertical or up-down direction of the elastic assembly. Namely, the present invention can eliminate the need for providing sliding dies separable in a horizontal direction of the elastic assembly. Thus, the mold to be used for molding the elastic member can be significantly simplified in construction, but also a mechanism for clamping and opening the mold can be simplified in construction.

In addition, because sliding dies separable in the horizontal direction of the elastic assembly are not used, the present invention can prevent production of unwanted burrs in the vertical direction during molding of the elastic member, thereby enhancing the durability of the elastic member.

Further, because the rotation-preventing member is attached to the upper end of the collar by mere press fitting, the present invention allows the rotation-preventing member to be readily attached to the collar.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
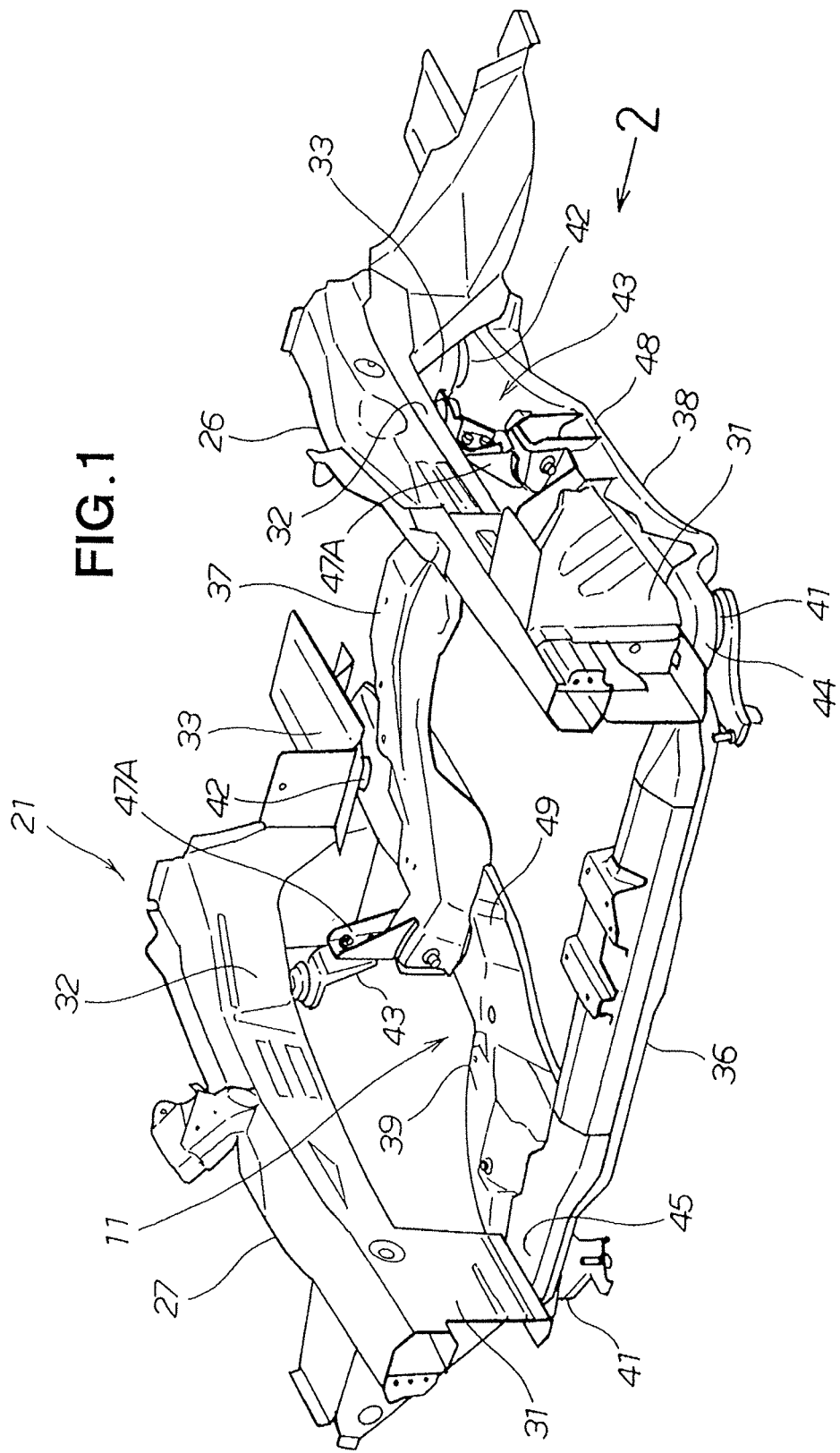
FIG. 1 is a perspective view showing a structure for mounting a subframe to a vehicle body according to an embodiment of the present invention.
Figure 2:
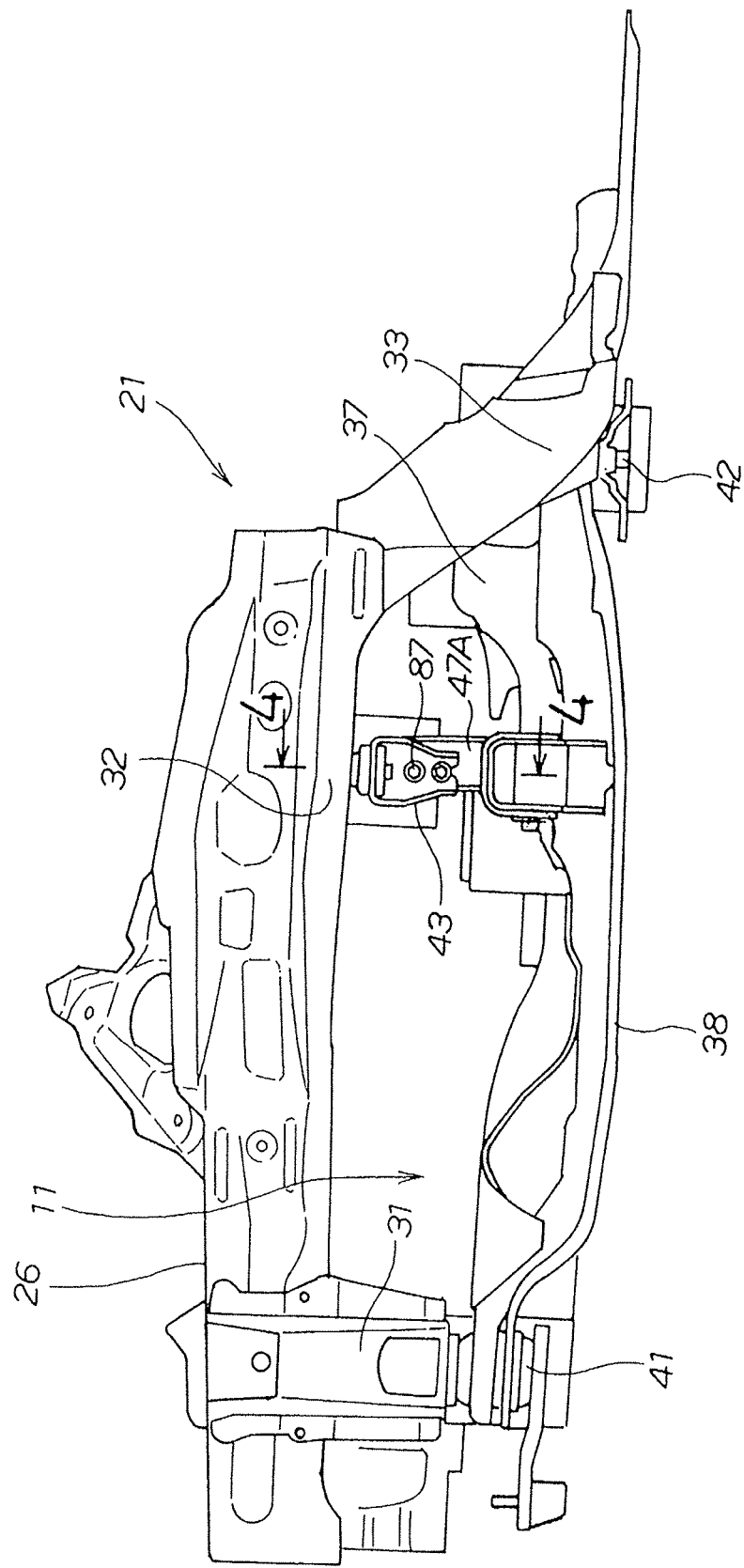
FIG. 2 is a view taken in a direction of arrow 2 of FIG. 1.

As shown in FIGS. 1 and 2, a subframe 11 is mounted to a front section of a body 21 of a vehicle. The front portion of the vehicle body 21 is a monocoque body which includes, as its main components, left and right front side frames 26 and 27. The left and right front side frames 26 and 27 extend in a front-rear direction of the vehicle body on left and right sides of the front section of the vehicle body 21.

The subframe 11 is located under the vehicle body 21, i.e. under the left and right front side frames 26 and 27. A not-shown engine and transmission are mounted on the subframe 11, and left and right suspensions are mounted on left and right sides of the subframe 11.

Figure 3:
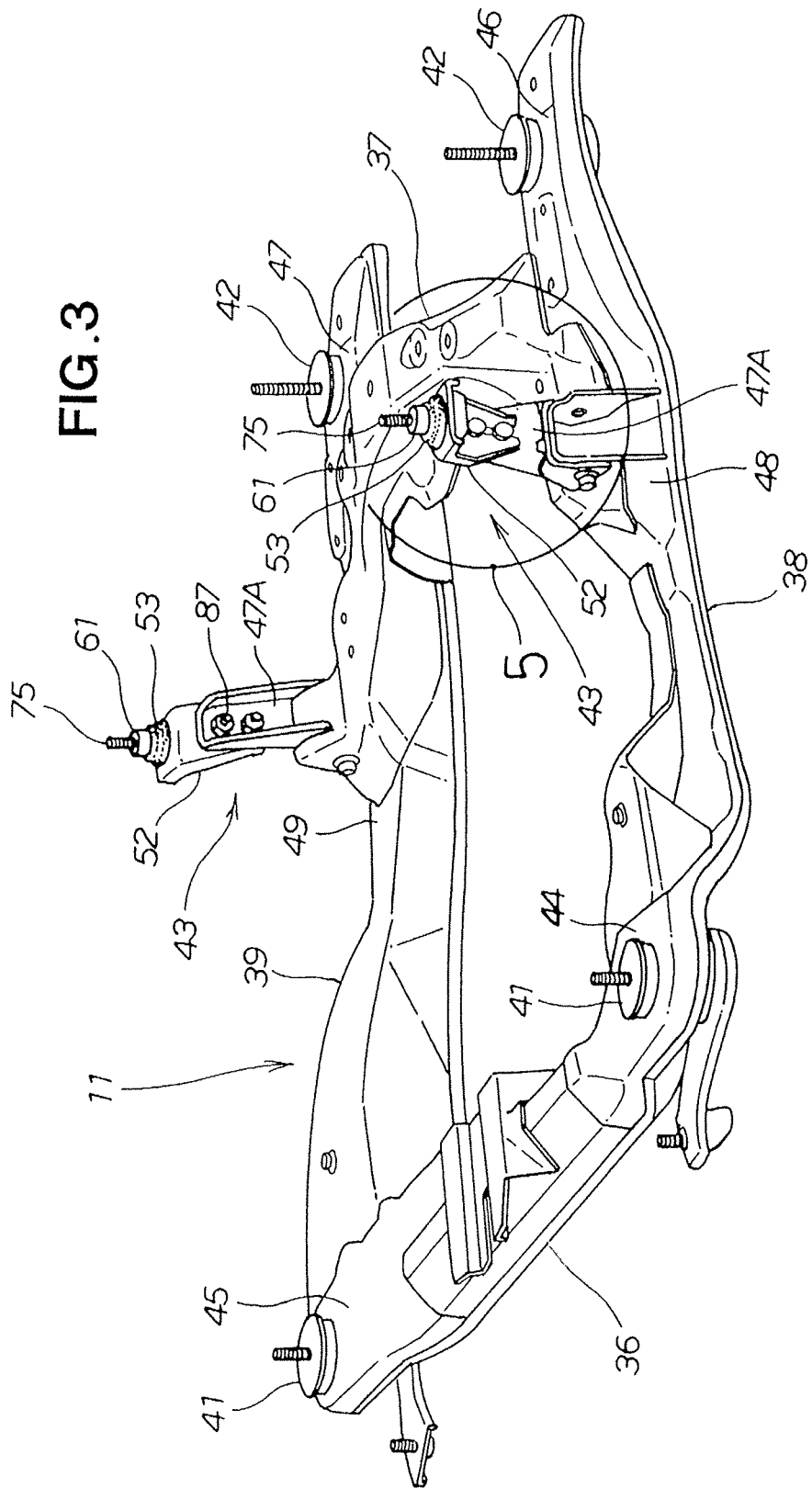
FIG. 3 is a perspective view of the subframe of FIG. 1.

As shown in FIGS. 1 to 3, the subframe 11 is a frame of a generally rectangular shape as viewed in plan, which includes an elongated front frame section 36 extending in a width direction of the vehicle, left and right frame sections 38 and 39 extending rearwardly from left and right ends of the front frame section 36, and a cross member 37 spanning between middle portions of the left and right frame sections 38 and 39.

The subframe 11 is mounted to the vehicle body 21 using a so-called floating-type mounting structure that mounts the subframe 11 to the vehicle body 21 via six elastic assemblies 41, 42 and 43 as detailed below.

Left and right front end portions 44 and 45 of the subframe 11 are fixedly mounted to left and right front support portions 31, respectively, of the left and right front side frames 26 and 27 via the front elastic assemblies 41.

Left and right rear end portions 46 and 47 of the subframe 11 are fixedly mounted to left and right rear support portions 33, respectively, of the left and right front side frames 26 and 27 via the rear elastic assemblies 42.

Further, left and right middle portions 48 and 49 of the subframe 11 are fixedly mounted to left and right middle support portions 32, respectively, of the left and right front side frames 26 and 27 via the middle elastic assemblies 43.

The following describe in detail the left middle elastic assembly 43, with reference to FIGS. 4 to 9. The right middle elastic assembly 43 is generally identical in construction to the left middle elastic assembly 43, and thus, a description of the right middle elastic assembly 43 is omitted to avoid unnecessary duplication.

Figure 4:
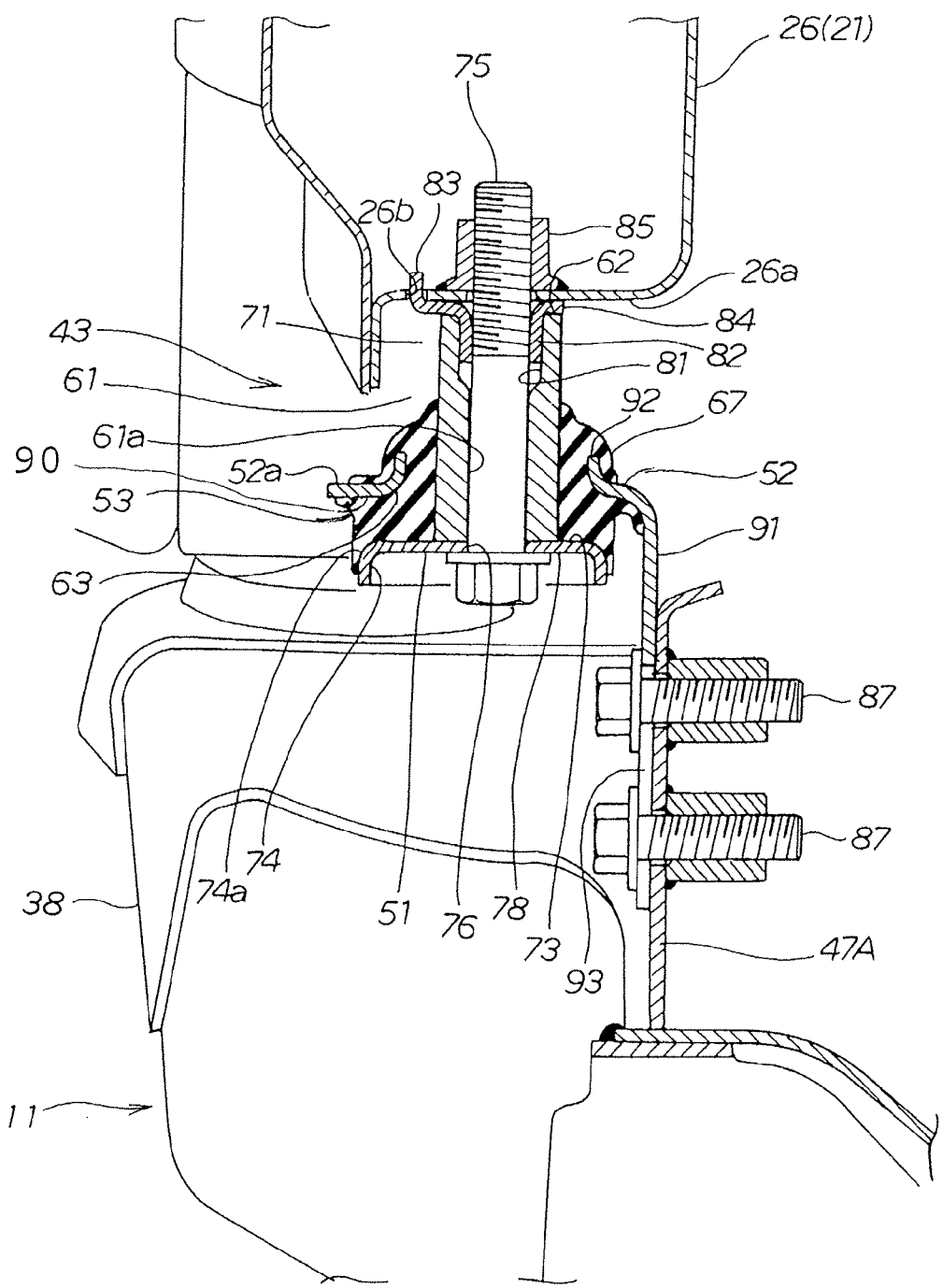
FIG. 4 is an enlarged sectional view taken along line 4-4 of FIG. 2.
Figure 5:
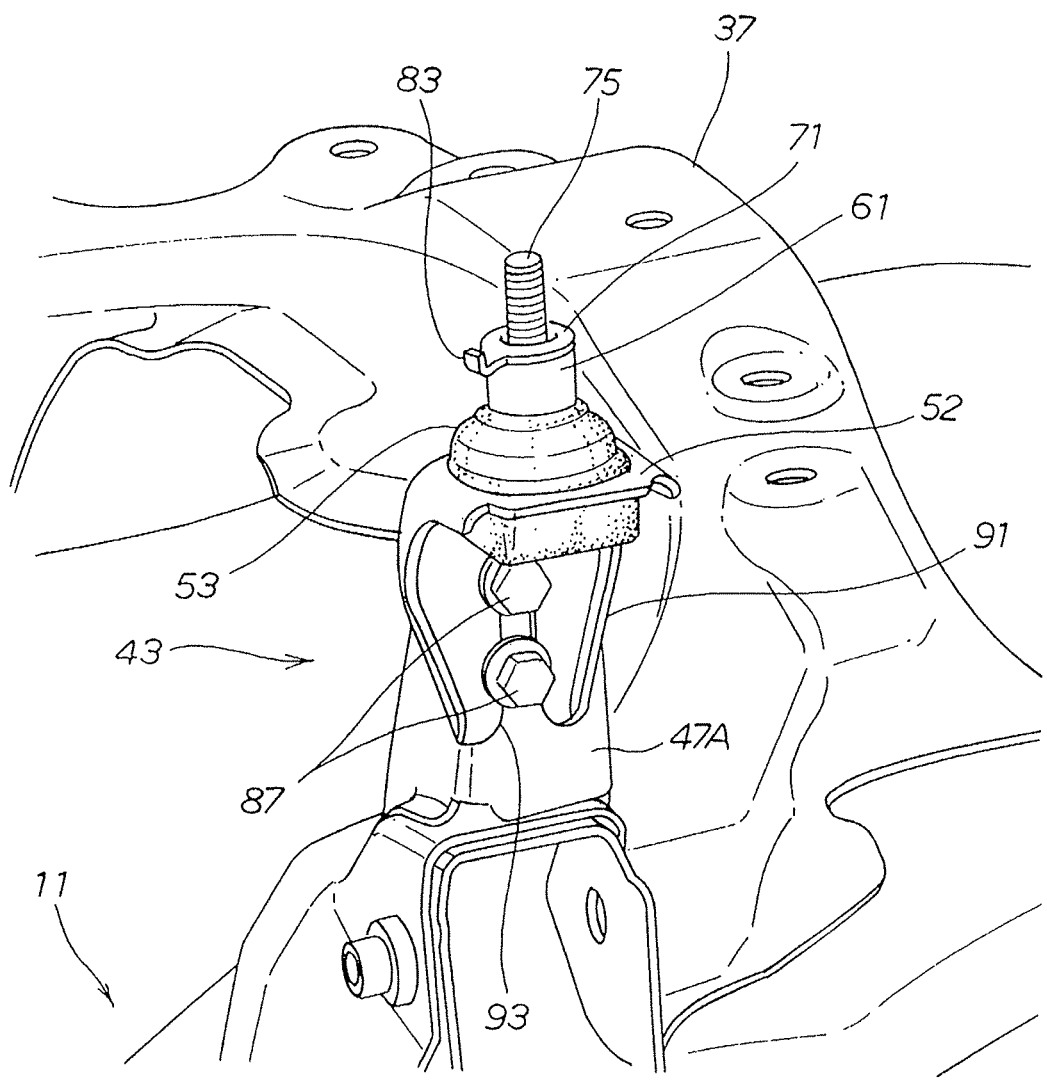
FIG. 5 is an enlarged view of a section encircled at 5 in FIG. 3.

As shown in FIG. 4, the left middle elastic assembly 43 includes a first mounting member 51, a second mounting member 52, an elastic member 53, a collar 61 and a rotation-preventing member 71.

As shown in FIGS. 2 and 4, the first mounting member 51 is located under the vehicle body 21, i.e. under the left front side frame 26, and over the subframe 11, and it is fixedly mounted to the vehicle body 21 (left front side frame 26) by means of a first bolt 75. Namely, the first mounting member 51 is located between the vehicle body 21 and the subframe 11.

Figure 7:
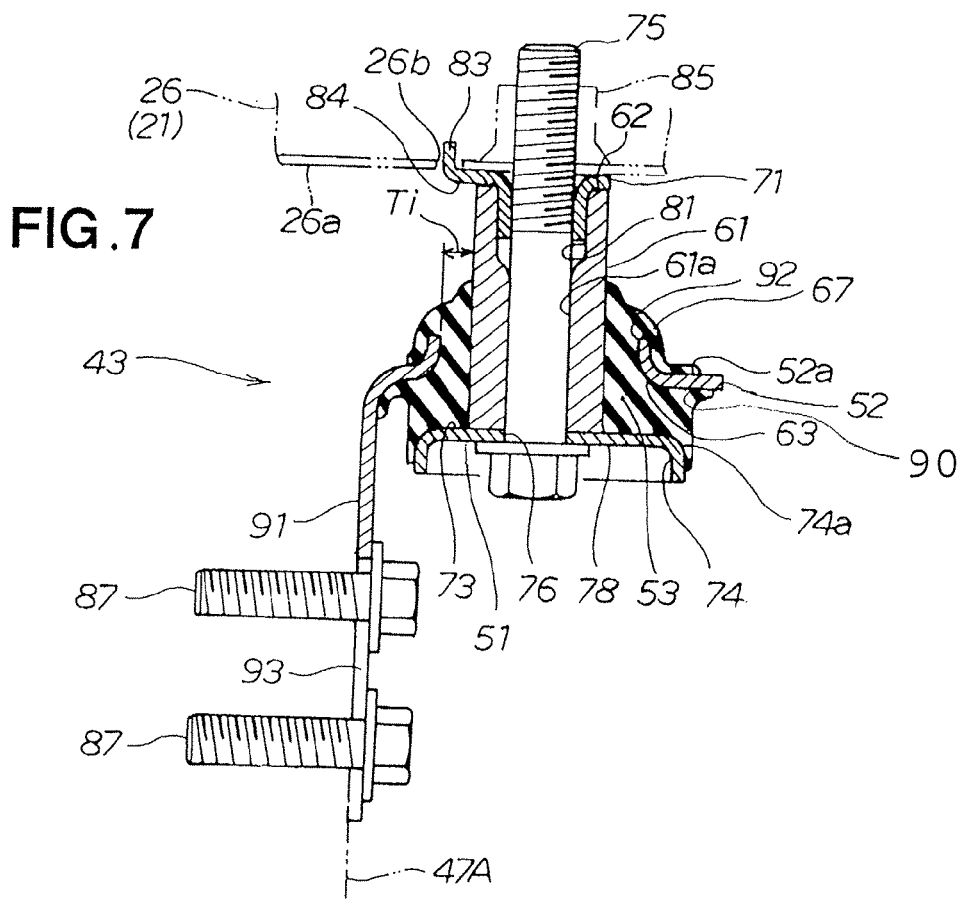
FIG. 7 is a sectional view taken along line 7-7 of FIG. 6.
Figure 9:
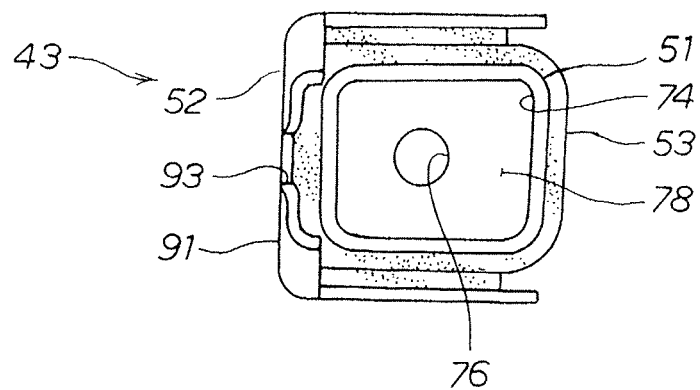
FIG. 9 is a view taken in a direction of arrow 9 in FIG. 8.

As shown in FIGS. 4, 7 and 9, the first mounting member 51 is a horizontal flat plate of a generally rectangular shape as viewed in plan and formed of metal, such as steel. The first mounting member 51 is bent along its outer peripheral edge downward toward the subframe 11. Namely, the first mounting member 51 includes, along its outer peripheral edge, a bent portion 74a arcuately bent downward with a predetermined bend radius, and a rib portion 74 extending downward from the lower end of the bent portion 74a. The rib portion 74 extends at right angles to a horizontal portion of the first mounting member 51. The first mounting member 51 further has a bolt inserting hole 76 extending centrally vertically through the thickness of the horizontal portion of the first mounting member 51.

As further shown in FIGS. 4, 7 and 9, the second mounting member 52 is located immediately over the first mounting member 51, i.e. spaced upwardly from the first mounting member 51 by a predetermined distance, and it is fixedly mounted to the sub frame 11. The predetermined distance, by which the second mounting member 52 is spaced from the first mounting member 51, is set such that the elastic member 53 can perform a sufficient vibration-absorbing performance.

More specifically, the second mounting member 52 is a horizontal flat plate of a generally rectangular shape as viewed in plan and formed of metal, such as steel. The second mounting member 52 is disposed in parallel to the first mounting member 51.

The second mounting member 52 has an opening portion 63 extending centrally vertically therethrough. The opening portion 63 is located concentrically with the bolt inserting hole 76 and has a greater diameter than the bolt inserting hole 76. The opening portion 63 has an upper end edge region bent upward toward the lower surface of the vehicle 21 (i.e., toward the lower surface 26a of the left front side frame 26). Namely, the opening portion 63 has, along its upper end edge, an anchoring portion 92 bent arcuately upwardly with a predetermined bent radius. The anchoring portion 92 is disposed at right angles to a flat, plate-like horizontal portion 90 of the second mounting member 52.

As shown in FIGS. 4 to 9, the second mounting member 52 further has a bracket portion 91 extending from the outer end edge of the peripheral wall downward toward the subframe 11. The bracket portion 91 is formed, for example, by bending one end portion of the flat second mounting member 52. The second mounting member 52 having such a bracket portion 91 has a generally vertically-inverted L overall shape as viewed in side elevation.

The bracket portion 91 has a vertically elongated slot 93 opening downwardly for passage therethrough second bolts 87, and the bracket portion 91 is fixedly mounted, for example, to a support portion 47A extending upward from the subframe 11 by means of the second bolts 87. As a consequence, the second mounting member 52 is mounted to the left middle section 48 of the subframe 11 as noted above.

Thus, the first mounting member 51, second mounting member 52 and front side frame 26 are positioned in the order mentioned in a down-to-up direction as viewed from the subframe 11.

As shown in FIGS. 4 and 7, the collar 61, which is a cylindrical member formed of a metal material such as steel, is placed on the upper surface 73 of the first mounting member 51 in a vertical direction thereto. The collar 61 may or may not be fixedly mounted to the first mounting member 51.

The collar 61 extends upward from the upper surface of the first mounting member 51 to pass through the opening portion 63 of the second mounting member 52, so that its upper end surface 62 is superposed on the underside of the vehicle body 21 (i.e., underside 26a of the left front side frame 26). In this way, the collar 61 positions the first mounting member 51 vertically relative to the vehicle body 21.

As shown in FIGS. 4 and 7, the first mounting member 51 is fixedly mounted to the vehicle body 21 by means of a first bolt 75 that is a fastener member screwed to a nut 85 fixed within the left front side frame 26.

Figure 8:
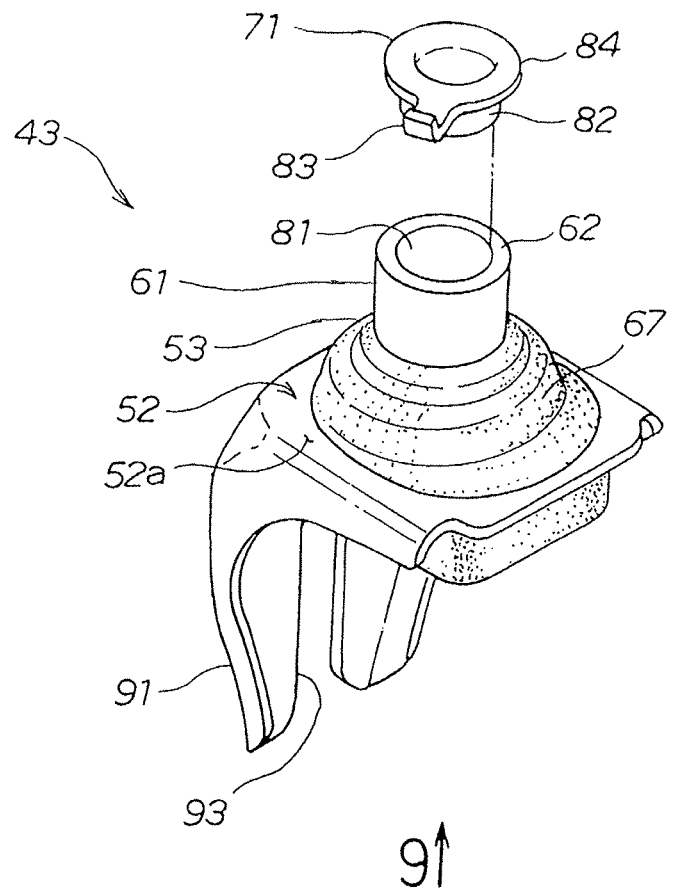
FIG. 8 is a perspective view showing relationship between the middle elastic assembly and a rotation-preventing member shown in FIG. 6.

More specifically, the first bolt 75 is vertically inserted through the bolt inserting hole 76 from below the first mounting member 51 and then axially through a through-hole 61a of the collar 61 to be ultimately screwed to the nut 85 of the vehicle body 21. The first mounting member 51 is fixedly mounted to the vehicle body 21 by the first mounting member 51 and the collar 61 being tightly fastened to the vehicle body 21 through cooperation between a head portion of the first bolt 75 abutted against the underside 78 of the first mounting member 51 and the nut 85, As shown in FIGS. 4 and 8, a rotation-preventing member 71 is attached to the upper end of the collar 61 in such a manner that it can prevent unwanted rotation of the collar 61 by engaging with the vehicle body 21 when the first bolt 75 is screwed to the vehicle body 21. More specifically, a fitting hole portion 81 is formed in an upper end portion of the collar 61, and the fitting hole 81 is located concentrically with the through-hole 61a and has a greater diameter than the through-hole 61a.

The rotation-preventing member 71 is an integrally-molded member that includes a fitting ring portion 82 and an engaging claw 83. The fitting ring portion 82 is a short cylindrical portion having a flange 84 at its one end and press-fit in the fitting hole portion 81. A degree of "fitting" of the fitting ring portion 82 in the fitting hole portion 81 (i.e., degree with which the ring portion 82 is fitted in the hole portion 81) is set such that the rotation-preventing member 71 is prevented from rotating relative to the fitting hole 81. Thus, the fitting ring portion 82 is integrally coupled with the fitting hole portion 81 against rotation relative to the fitting hole portion 81, The upper end surface 62 of the collar 61 is superposed at the flange 84 on the underside of the vehicle body 21 (i.e., underside 26a of the left front side frame 26).

The engaging claw 83 is a generally L-shaped claw that projects radially outwardly from the outer periphery of the flange 84 and then extends from the distal end of the radially-projecting portion upward toward the vehicle body 21. The engaging claw 83 is fittable in an engaging recess 26b formed in the underside of the vehicle body 21 (i.e., underside 26a of the left front side frame 26). Rotation of the collar 61 relative to the vehicle body 21 can be prevented by the engaging claw 83 being fittingly engaged in the engaging recess 26b with the rotation-preventing member 71 attached to the collar 61. As a consequence, rotation of the middle elastic assembly 43 relative to the vehicle body 21 can be prevented. Note that the provision of the flange 84 is optional, i.e. the flange 84 may or may not be provided.

As shown in FIGS. 4 and 7, the elastic member 53 is a vibration-absorbing member formed of rubber and disposed between the first and second mounting members 51 and 52. The elastic member 53 is formed integrally with the first and second mounting members 51 and 52 and collar 61 in such a manner as to wrap around the outer peripheral surfaces of the first and second mounting members 51 and 52 and collar 61. The outer periphery of the collar 61 is wrapped around by the elastic member 53 up to its portion above the second mounting member 52; namely, a lower half portion of the collar 61 is wrapped around by the elastic member 53. Thus, the first and second mounting members 51 and 52, collar 61 having the rotation-preventing member 71 attached thereto, and the elastic member 53 are integrally joined together to constitute the one middle elastic assembly 43.

As described above in relation to FIGS. 4 and 7, the rib portion 74 extending downward via the arcuately bent portion 74a is formed on and along the outer periphery of the first mounting member 51. The elastic member 53 disposed between and integrally joined to the first and second mounting members 51 and 52 also extends downward to wrap around the outer peripheral surface of the rib portion 74 and is integrally joined to the rib portion 74. Namely, the elastic member 53 is joined not only to the upper surface 73 of the first mounting member 51 but also to the respective outer peripheral surfaces of the bent portion 74a and rib portion 74. Thus, a relatively large joined surface area is secured between the first mounting member 51 and the elastic member 53. The large joined surface area can disperse stress when a load has acted on the elastic assembly 43. Further, because the first mounting member 51 has the arcuately bent portion 74a on and along the outer periphery thereof, it can minimize concentration of stress produced in the outer peripheral region of the first mounting member 51. Thus, it is possible to increase durability of a portion of the elastic assembly 43 where the elastic member 53 is joined to the first mounting member 51.

As further shown in FIGS. 4 and 7, the upper peripheral edge region of the opening portion 63 of the second mounting member 52 is arcuately bent upward to form the annular anchoring portion 92 extending upward. The anchoring portion 92 has an inner diameter set greater than the outer diameter of the collar 61. The elastic member 53 also has a portion disposed between the outer peripheral surface of the collar 61 and the inner peripheral surface of the anchoring portion 92. The portion disposed between the outer peripheral surface of the collar 61 and the inner peripheral surface of the anchoring portion 92 has a thickness Ti (see FIG. 7) that corresponds to a difference in diameter between the collar 61 and the anchoring portion 92. For an enhanced durability of the elastic member 53, it is preferable that the difference in diameter, i.e. the thickness Ti, be appropriately large.

In order to permit efficient transmission of a load between the first and second mounting members 51 and 52 via the elastic member 53 and enhance vibration reducing performance of the elastic member 53, it is preferable to increase the joined surface area between the second mounting member 52 and the elastic member 53. One conceivable way to increase the joined surface area is to reduce the diameter of the opening portion 63 so that the gap between the edge of the opening portion 63 and the outer peripheral surface of the collar 61 decreases and thus the thickness Ti of the elastic member 53 filled in the gap decreases. As a consequence, a portion of the elastic member 53 where the thickness Ti is relatively small will have an increased amount of deformation in the vertical or up-down direction. Thus, it is necessary to increase the thickness Ti in order to increase the durability of the elastic member 53.

Further, in the instant embodiment, the upper peripheral edge region of the opening portion 63 of the second mounting member 52 is arcuately bent upward to form the anchoring portion 92 that extends upward. The provision of such an anchoring portion 92 can increase the joined surface area between the second mounting member 52 and the elastic member 53, and the thus-increased joined surface area can disperse stress produced when a load has acted on the elastic assembly 43. Further, because the portion of the second mounting member 52 between the edge of the opening portion 63 and the anchoring portion 92 is formed as an arcuately bent portion, concentration of stress produced in the upper peripheral edge region of the opening portion 63 can be minimized. Thus, the portion where the elastic member 53 is joined to the second mounting member 52 can be increased in mechanical strength.

Further, because the provision of the anchoring portion 92 can increase the joined surface area between the second mounting member 52 and the elastic member 53, the opening portion 63 need not be reduced in diameter in order to increase the joined surface area. Thus, the elastic member 53 can have an increased thickness Ti at the position of the opening portion 63, and such an increased thickness Ti can reduce the amount of deformation in the vertical direction. Consequently, the durability of the elastic member 53 can be increased.

Figure 6:
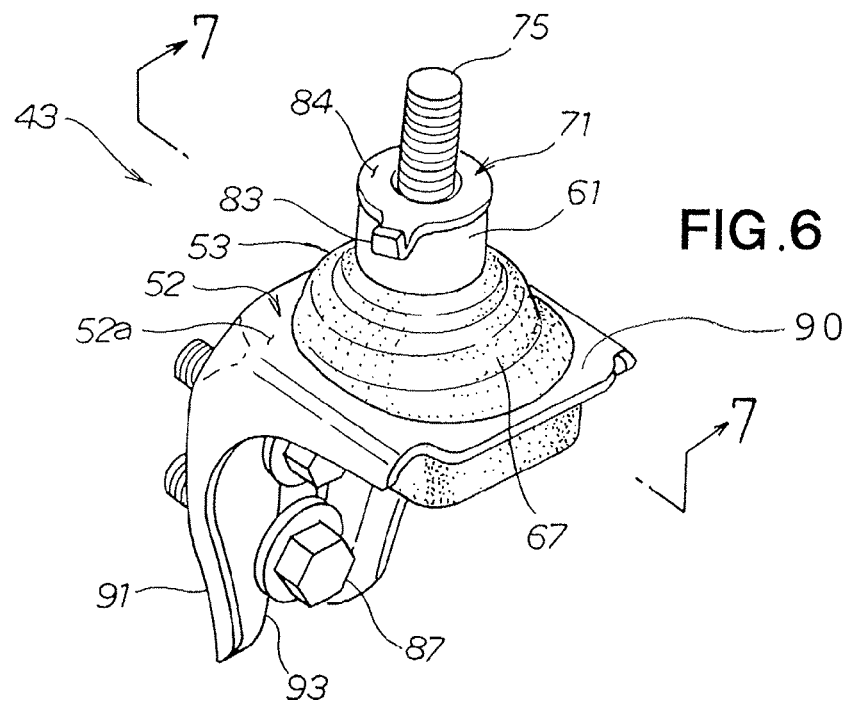
FIG. 6 is a perspective view of a middle elastic assembly of FIG. 5.

Further, as shown in FIGS. 4, 6 and 7, the elastic member 53 is disposed on the upper surface 52a of the second mounting member 52 in such a manner as to wrap around the collar 61 extending axially through the second mounting member 52 (opening portion 63 and anchoring portion 92) and the upper surface 52a and outer peripheral edge region of the horizontal portion of the second mounting member 52. Namely, the elastic member 53 wraps around the upper surface 52a and opening portion 63 of the second mounting member 52, and it also includes a bulging portion 67 wrapping around the anchoring portion 92. Thus, it is possible to minimize concentration of stress produced in the elastic member 53 around the collar 61 extending axially through the elastic member 53 and around the outer peripheral region of the second mounting member 52, thereby enhancing the durability of the portion where the elastic member 53 is joined to the second mounting member 52.

Further, when the elastic member 53 is to be set into a mold in a later-described step of molding the elastic member 53, not-shown adhesive is applied to at least surfaces of the first and second mounting members 51 and 52 and collar 61 which are to be joined to the elastic member 53. Such application of adhesive allows the elastic member 53 to be more firmly joined to the first and second mounting members 51 and 52 and collar 61.

The above-described embodiment of the structure for mounting the subframe 11 can achieve the following advantageous benefits. As shown in FIG. 4, the structure for mounting the subframe 11 is characterized in that, in the middle elastic assembly 43, the second mounting member 52 is placed immediately above the first mounting member 51, fixedly mounted to the vehicle body 21, via the elastic member 53 and fixedly mounted to the subframe 11.

Thus, a downward load of the subframe 11 is transmitted from the second mounting member 52 onto the elastic member 53 as a compressive load, then from the elastic member 53 onto the first mounting member 51, and then from the first mounting member 51 to the vehicle body 21 via the first bolt 75.

Namely, the elastic member 53 is compressed between the first and second mounting members 51 and 52, so that the durability of the elastic member 53 can be enhanced and the durability of the joint, to the first and second mounting members 51 and 52, of the elastic member 53 can also be enhanced.

Further, in the instant embodiment, the elastic member 53 is integrally formed with the first and second mounting members 51 and 52 and collar 61 in such a manner as to wrap around the first and second mounting members 51 and 52 and around the collar 61 for vertically positioning the mounting member 51 relative to the vehicle body 21. In this manner, vertical vibration transmitted from the subframe 11 to the mounting member 51 can be sufficiently received and absorbed by the elastic member 53.

The following describe how the middle elastic assembly 43 for mounting the subframe 11 to the vehicle body 21 is manufactured (i.e., a method for manufacturing the middle elastic assembly 43), with reference to FIGS. 8 and 10 to 12.

Figure 12:
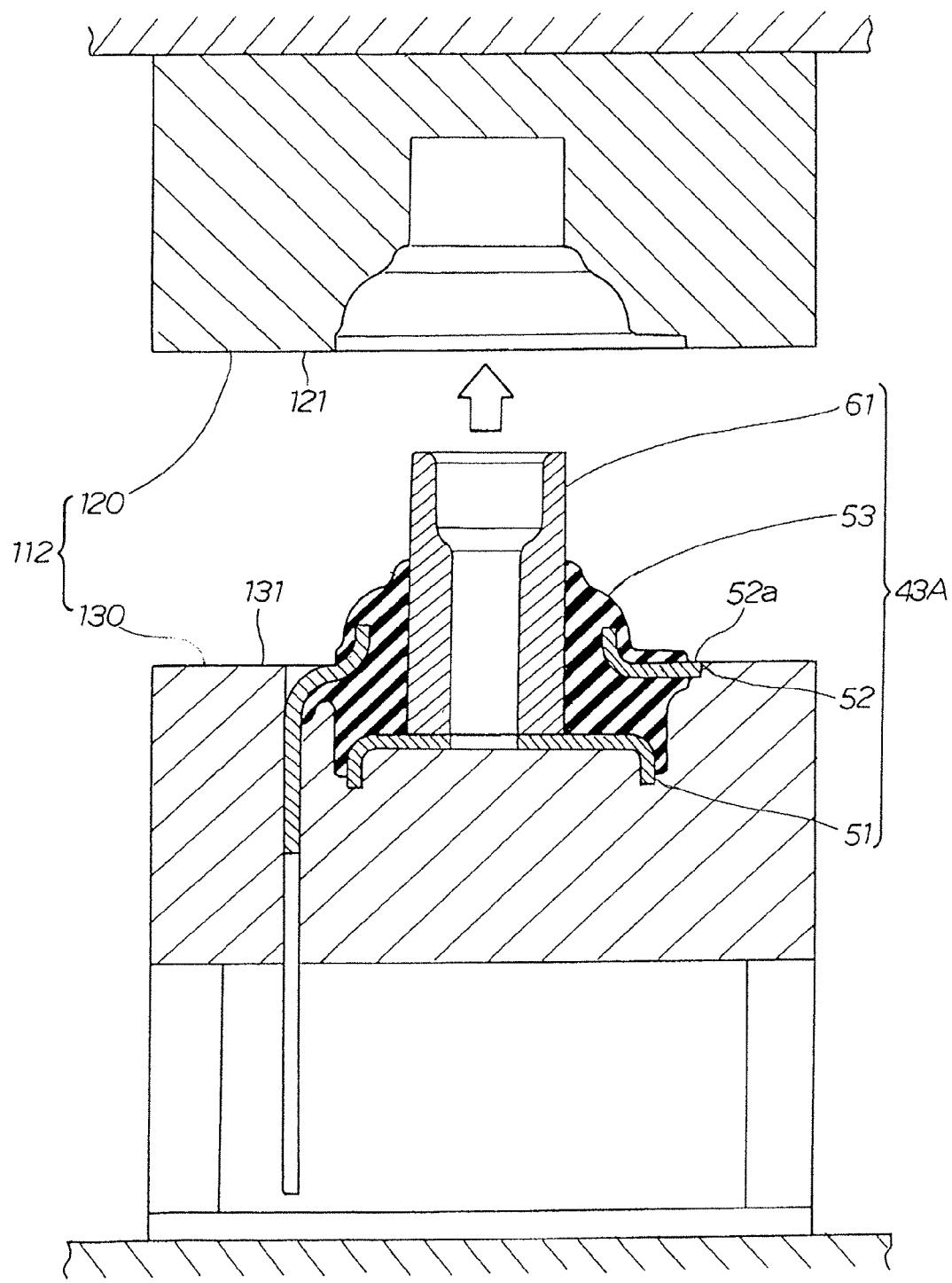
FIG. 12 is a sectional view showing a step of opening the mold shown in FIG. 11.

First, the first and second mounting members 51 and 52 and the collar 61 shown in FIG. 12, and the rotation-preventing member 71 shown in FIG. 8 are prepared (first step, or metal member preparation step). The rotation-preventing member 71 may be prepared at a later time.

Then, adhesive is applied to at least predetermined portions of the first and second mounting members 51 and 52 and collar 61, i.e. the surfaces of the first and second mounting members 51 and 52 and collar 61 which are to be joined to the elastic member 53 (see FIG. 7) to form a not-shown adhesive layer (second step, or adhesive application step). Such application of adhesive allows the elastic member 53 to be more firmly joined to the first and second mounting members 51 and 52 and collar 61.

Figure 10:
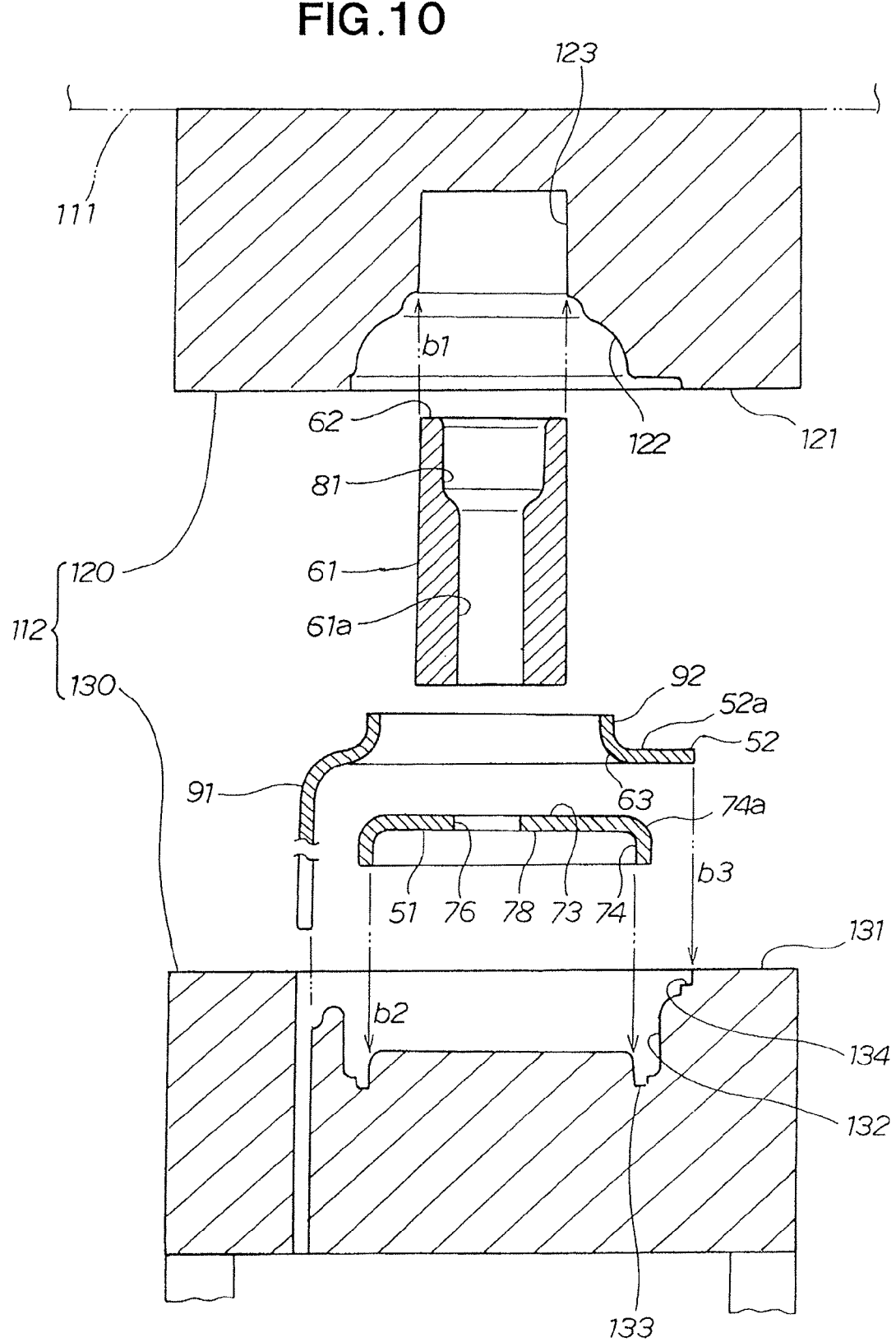
FIG. 10 is a sectional view showing a step of setting first and second mounting members and a collar into a mold in accordance with a method for manufacturing the middle elastic assembly.
Figure 11:
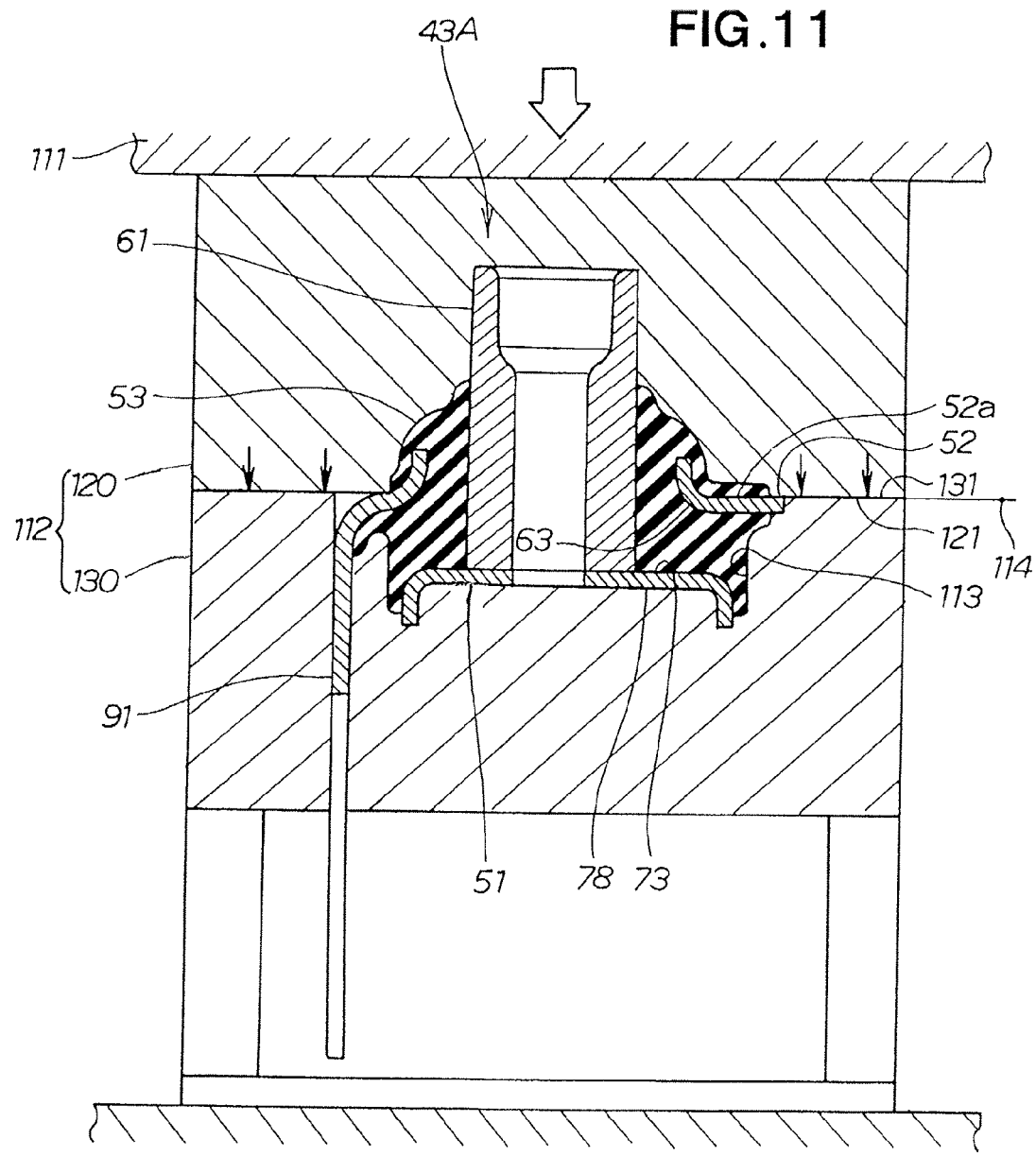
FIG. 11 is a sectional view showing a step of pouring rubber composition into a cavity of the mold shown in FIG. 10.

Then, as shown in FIG. 10, the first and second mounting members 51 and 52 and collar 61 are set into a mold 112 attached to a molding machine 111, and then the mold 112 is closed and clamped (third step, or metal member setting step). The mold 112 is a two-part mold dividable only in the vertical or up-down direction of the elastic member 53 (see FIG. 7). The opening/closing direction of the mold 112 corresponds to the longitudinal direction of the collar 61 shown in FIG. 7. More specifically, the mold 112 comprises an upper molding die 120 and a lower molding die 130 openable and closable in the vertical direction. For example, the lower molding die 130 is a fixed die, while the upper molding die 120 is a movable die vertically movable relative to the lower molding die 130.

The upper molding die 120 has a mating surface 121 at its lower end, a mold surface 122 formed inwardly of the mating surface 121, and a collar retaining portion 123 formed centrally in the upper molding die 120 continuously with the mold surface 122. The mating surface 121 is designed so as to conform or substantially conform to the upper surface 52a of the second mounting member 52 shown in FIG. 7. The mold surface 122 defines a concave portion for molding an upper half portion of the elastic portion 53 shown in FIG. 7. The collar retaining portion 123 is a concave portion for retaining an upper half portion of the collar 61 of FIG. 7 in a predetermined position.

The lower molding die 130 has a mating surface 131 at its upper end, a mold surface 132 formed inwardly of the mating surface 131, and a first-mounting-member retaining portion 133 and second-mounting-member retaining portion 134 formed continuously with the mold surface 132. The mating surface 131 is designed so as to conform or substantially conform to the upper surface 52a of the second mounting member 52. The mold surface 132 defines a concave portion for molding a lower half portion of the elastic member 53 shown in FIG. 7. The first-mounting-member retaining portion 133 is a concave portion for retaining the first mounting member 51 of FIG. 7 in a predetermined position. The second-mounting-member retaining portion 134 is a concave portion for retaining the second mounting member 52 of FIG. 7 in a predetermined position.

According to one specific example of the third or metal member setting step, the collar 61 is set into the collar retaining portion 123 as indicated by arrow b1, the first mounting member 51 is set into the first-mounting member retaining portion 133 as indicated by arrow b2, and the second mounting member 52 is set into the second-mounting-member retaining portion 134 as indicated by arrow b3. Then, the mold 112 is closed and clamped. At that time, the mating surfaces 121 and 131 conform to the upper surface 52a of the second mounting member 52, and a cavity 113 is formed inside the mold 112.

Then, unvulcanized rubber composition (rubber material) is poured into the cavity 113 of the mold 112 and vulcanized to mold a rubber member of a predetermined shape, at the same time of which the rubber member is adhered to the first and second mounting members 51 and 52 and collar 61. In this manner, the elastic member 53 is molded (fourth or elastic member molding step). The rubber composition may be poured into the cavity 113 by any suitable well-known method, such one used in injection molding or transfer molding.

As a result, the elastic member 53 is integrally joined to the first and second mounting members 51 and 52 and collar 61 in such a manner to wrap around predetermined portions of the first and second mounting members 51 and 52 and collar 61. In this manner, there is produced a semi-finished elastic assembly product 43A having the elastic member 53 integrally joined to the first and second mounting members 51 and 52 and collar 61. Because a parting line 114 of the mold 112, i.e. the mating surfaces 121 and 131, conform to the upper surface 52a of the second mounting member 52, no burr occurs on the molded elastic member 53.

Then, the mold 112 is opened to take out the semi-finished elastic assembly product 43A (fifth or semi-finished-elastic-assembly-product taking-out step). After that, the rotation-preventing member 71 is attached to the upper end (upper end surface 62) of the collar 61 by press fitting, so that the middle elastic assembly 43 shown in FIG. 6 is completed (sixth or elastic member molding step).

According to the above-described method for manufacturing the middle elastic assembly 43, the collar 61 can be pulled out from the upper molding die after the mold 112 is opened. Thus, the mold 112 (upper molding die 120) that retains the collar 61 can be simplified in construction.

Namely, according to the middle elastic assembly manufacturing method of the present invention, the elastic member 53 is integrally molded to the first and second mounting members 51 and 52 and collar 61 using the mold 112 dividable only in the vertical or up-down direction of the elastic assembly 43, and then, the rotation-preventing member 71 is attached to the upper end (upper end surface 62) of the collar 61 by press fitting.

Thus, the rotation-preventing member 71 of FIG. 7, which projects radially outwardly beyond the collar 61, has not yet been attached when the elastic member 53 is to be molded, and thus, the mold 112 to be used for molding the elastic member 53 has to be dividable only in the vertical or up-down direction of the elastic assembly 43. Namely, the instant embodiment can eliminate the need for providing sliding dies separable in the horizontal direction of the elastic assembly 43. Thus, the mold 112 to be used for molding the elastic member 53 can be significantly simplified in construction, but also a mechanism for clamping and opening the mold 112 can be simplified in construction.

In addition, because sliding dies separable in the horizontal direction of the elastic assembly 43 are not used, the instant embodiment can prevent production of unwanted burrs in the vertical direction during molding of the elastic member 53, thereby enhancing the durability of the elastic member 53.

Further, because the rotation-preventing member 71 is attached to the upper end of the collar 61 by mere press fitting, the instant embodiment allows the rotation-preventing member 71 to be readily attached to the collar 61.

What is claimed is:

1. A structure for mounting a subframe to a vehicle body, the structure comprising:
    the vehicle body;
    an elastic assembly; and
    the subframe located under the vehicle body and mounted to the vehicle body via the elastic assembly,
    the elastic assembly including:
        a first mounting member located under the vehicle body and over the subframe and mounted to the vehicle body;
        a second mounting member mounted to the subframe and extending upward from the subframe to be located immediately above the first mounting member; and
        an elastic member disposed between the first mounting member and the second mounting member,
            wherein the first mounting member is mounted to the vehicle body by a cylindrical collar disposed between the first mounting member and the vehicle body, and a bolt extending vertically through the first mounting member and through the collar and screwed to the vehicle body,
            wherein the second mounting member has a flat plate-shaped horizontal portion directly transmitting a downward load of the subframe to the elastic member, an opening portion formed in the plate-shaped horizontal portion and disposed concentrically with the collar, and an annular anchoring portion extending upward from an inner peripheral edge of the opening portion, and
            wherein the elastic member is integrally molded to the first and second mounting members and the collar in such a manner as to wrap around the first and second mounting members and the collar.

2. The structure according to claim 1, wherein
the collar extends upward from an upper surface of the first mounting member to extend through the opening portion of the second mounting member, the collar having an upper end surface superposed on an underside of the vehicle body to thereby vertically position the first mounting member relative to the vehicle body.

3. The structure according to claim 2, wherein the elastic member is disposed on an upper surface of the second mounting member to wrap around the collar extending axially through the opening portion of the second mounting member, an upper surface of the first mounting member, and an inner peripheral edge region of the second mounting member including the anchoring portion.

4. The structure according to claim 1, wherein the elastic assembly includes a rotation-preventing member attached to the upper end of the collar and configured to engage with a part of the vehicle body for preventing the collar from rotating relative to the vehicle body.

5. The structure according to claim 1, wherein the bolt extends vertically upwardly through the first mounting member and through the collar and is screwed to a threaded member fixed to the vehicle body.

6. The structure according to claim 1, wherein the first mounting member includes an arcuately bent portion formed on and along an outer periphery thereof and a rib portion extending downward via the arcuately bent portion, and the elastic member is joined to the upper surface of the first mounting member and to outer peripheral surfaces of the arcuately bent portion and rib portion.

7. A structure for mounting a subframe to a vehicle body, the structure comprising:
    the vehicle body;
    an elastic assembly; and
    the subframe located under the vehicle body and mounted to the vehicle body via the elastic assembly,
    the elastic assembly including:
        a first mounting member located under the vehicle body and over the subframe and mounted to the vehicle body;
        a second mounting member mounted to the subframe and extending upward from the subframe to be located immediately above the first mounting member; and
        an elastic member disposed between the first mounting member and the second mounting member,
            wherein the first mounting member is mounted to the vehicle body by a cylindrical collar disposed between the first mounting member and the vehicle body, and a bolt extending vertically through the first mounting member and through the collar and screwed to the vehicle body,
            wherein the elastic member is integrally molded to the first and second mounting members and the collar in such a manner as to wrap around the first and second mounting members and the collar, and
            wherein the first mounting member includes an arcuately bent portion formed on and along an outer periphery thereof and a rib portion extending downward via the arcuately bent portion, and the elastic member is joined to the upper surface of the first mounting member and to outer peripheral surfaces of the arcuately bent portion and rib portion.

* * * * *